May 26, 1964  D. D. MAXSON  3,134,222
ROCKET ENGINE CONTROL
Filed May 18, 1960
FIG. 2
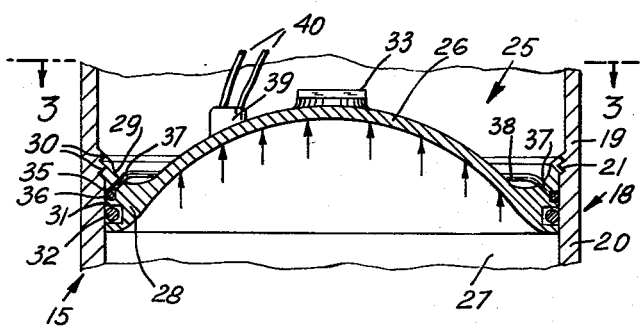
FIG. 1
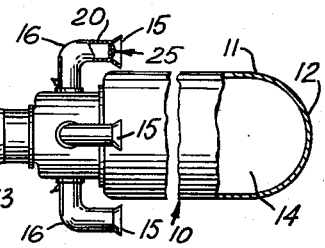
FIG. 3
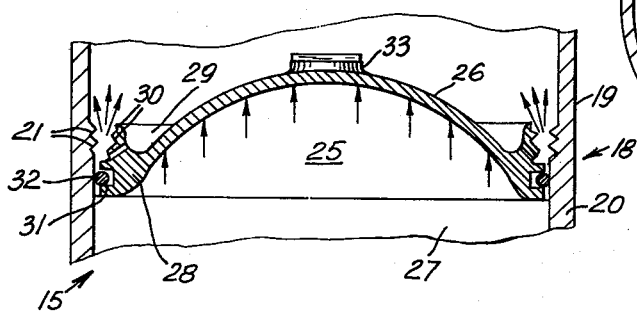
FIG. 4
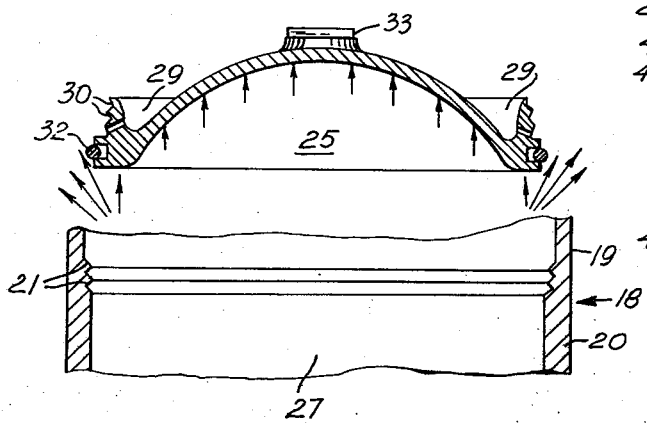
FIG. 6
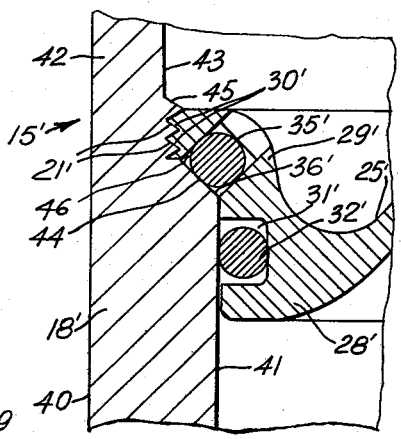
FIG. 5
INVENTOR.
DONALD D. MAXSON
BY
Curtis, Morris & Safford
ATTORNEYS

United States Patent Office 3,134,222
Patented May 26, 1964

3,134,222
ROCKET ENGINE CONTROL
Donald D. Maxson, Yardley, Pa., assignor to Thiokol Chemical Corporation, Bristol, Pa., a corporation of Delaware
Filed May 18, 1960, Ser. No. 29,910
7 Claims. (Cl. 60—35.6)

The present invention relates to a release device particularly adapted for use on rocket engines to control thrust. While the invention may have other applications for the instantaneous release of a force, it is shown and described as applied to a rocket engine.

Rocket engines comprise a casing containing a combustible fuel and having a nozzle at one end. When the fuel burns, it produces products of combustion in the casing at high pressure which escape through the nozzle at a high velocity and produce a thrust to propel the rocket.

It is desirable in many instances to be able to terminate the forward thrust on a rocket or stage of a rocket while in flight. For example, it may be desirable to produce a fixed terminal velocity of the rocket to control its path in a trajectory or in space, or to produce a fixed terminal velocity of a particular stage of a staged rocket, or to produce a reverse thrust on a stage of a rocket casing at the end of its burning cycle to separate the stages. To this end, the rocket casing or a staged section of the casing is provided with an auxiliary nozzle or nozzles for producing a thrust opposing the thrust of the main nozzle to cancel or reverse the direction of the resultant thrust acting on the rocket.

One of the objects of the present invention is to provide an improved releasable plug for closing an auxiliary nozzle of a rocket engine which adapts it to be blown free of the nozzle when released.

Another object is to provide an improved closure plug of the type indicated in which a radially projecting locking rib is deformed by an explosive charge to release a closure plug from its locked engagement with the wall of the auxiliary nozzle.

Another object is to shrink a radially projecting screw threaded section of a closure plug by an explosive charge to release it from engagement with screw threads on the wall of the nozzle.

Still another object is to provide a closure plug of the type indicated which is of simple and compact construction, economical to manufacture and one which is reliable in operation.

These and other objects will become more apparent from the following description and drawings in which like reference characters denote like parts throughout the several views. It is to be expressly understood, however, that the drawing is for the purpose of illustration only and is not a definition of the limits of the invention, reference being had for this purpose to the appended claims.

In the drawing:

FIGURE 1 illustrates a rocket with auxiliary nozzles for controlling the thrust and incorporating the nozzle closure plugs of the present invention;

FIGURE 2 is an enlarged sectional view showing the improved closure plug of the present invention locked in position in the nozzle;

FIGURE 3 is a sectional plan view of the nozzle and plug and showing the ignitor and fuses for igniting the explosive charge;

FIGURE 4 is a view similar to FIGURE 2 showing the flange of the closure plug deformed inwardly or shrunk to disengage its screw threads from the screw threads on the nozzle wall;

FIGURE 5 is a view similar to FIGURES 2 and 4 and showing the closure plug being blown from the nozzle; and FIGURE 6 is a sectional view showing a plug and explosive charge of modified construction.

Referring to FIGURE 1 of the drawings, the invention is shown applied to a rocket 10 having a cylindrical casing 11 closed at its forward end 12 and having a main propulsion nozzle 13 at its rearward end. The casing 11 itself may constitute a combustion chamber 14, especially when solid fuels are used, or may contain a separate chamber containing fluid under pressure, or a separate combustion chamber where fuel is burned. The burning of the fuel in the combustion chamber 14 produces products of combustion at a high pressure which, as they escape through the main propulsion nozzle 13 at high velocity, produce a forward thrust on the rocket 10.

The casing 11 of the rocket 10 also is provided with auxiliary nozzles 15 for producing a cancelling or reversing thrust on the rocket 10. In the illustrated embodiment the auxiliary nozzles 15 are shown located adjacent to but forwardly of the main nozzle 13. Four of such nozzles 15 are illustrated in FIGURE 1 and each is located at the end of a right angular tube 16 projecting radially and then forwardly with the nozzle facing in the opposite direction from the main nozzle 13. In the illustrated embodiment, the tubes 16 open into and communicate with the combustion chamber 14 of the rocket 10. It is to be understood, however, that the auxiliary nozzles 15 may be located at other positions on the rocket casing and connected directly to the combustion chamber 14, connected to a separate chamber containing a fluid under pressure, or connected to a chamber containing seperate supply of fuel. For example, one or more of the auxiliary nozzles 15 may be located at the forward end of the rocket motor casing 11 either at the exterior or at the interior and extending to an opening in the casing. As illustrated in the enlarged views in FIGURES 2 to 5, each of the auxiliary nozzles 15 comprises a cylindrical wall 18 connected to the source of fluid under pressure in the casing 11, such as the combustion chamber 14, but it will be understood that the wall may have any shape to form a nozzle and jet for producing the desired thrust.

In accordance with the present invention, each auxiliary nozzle is closed by a closure plug locked to the nozzle wall and adapted to be blown clear of the nozzle when released. The closure plug is locked to the wall of its nozzle by interengaging shoulders on the periphery of the parts including a rib on one part projecting into a recess on the other part. The closure plug is released by an explosive charge surrounding the plug and acting between the wall and plug when detonated to deform the rib and withdraw it from interlocking engagement with the recess on the other part. Thus, the locking mechanism is formed as an integral part of the nozzle and plug. In the illustrated embodiment, the interlocking ribs project radially from the closure plug in the form of screw threads engaging screw threads in the nozzle wall.

As shown in FIGURE 2, the interior of the cylindrical wall 18 of nozzle 15 is stepped to provide a section 19 of a slightly larger inside diameter than the adjacent section 20. The inside face of the section 20 adjacent the section 19 is tapped to provide screw threads 21. The screw threads 21 constitute a recess or recesses in the wall 18.

The closure plug 25 is in the form of a piston having a head 26 extending across the jet forming orifice 27 of the nozzle 15 and a peripheral rim 28 closely fitting the cylindrical wall 18. The head 26 of the piston plug 25 is illustrated as having a spherical contour but it may be made flat or of any suitable shape. Projecting axially from the rim 28 of the piston plug 25 is an annular flange 29 of the same diameter as the rim. Flange 29 has screw threads 30 projecting radially beyond the outside diameter of the rim 28 and interlocking with the screw threads 21 in the wall 18 to lock the closure plug 25 to nozzle wall 18. Thus, the radially projecting screw threads 30 on the piston plug 25 constitute a rib or ribs projecting radially beyond the plug and engaging recesses in the wall 18. The rim 28 of the piston closure plug 25 also has an annular groove 31 with a gasket 32 therein to seal the joint between the periphery of the closure plug and wall 18 of the nozzle 15. The head 26 of the closure plug 25 is provided with a nut 33 projecting from the head to adapt the plug to be screwed into the wall 18 of the nozzle 15.

The explosive charge 35 is in the form of a ring positioned in a recess 36 in the periphery of the rim 28 and positioned between the wall 18 and flange 29 of the closure plug 25. Closure plug 25 has holes 37 extending from the upper face of the piston plug to the annular groove 36 containing the explosive charge 35. As shown in FIGURES 2 and 3, fuses 38 extend through the holes 37 to contact the explosive charge 35 at spaced points around its periphery. The opposite ends of the fuses are connected to an ignitor 39 for igniting the fuses 38. The ignitor 39 may be electrically operated and has connecting wires 40 from a control mechanism, not shown. A single fuse 38 may be used, but as shown two separate fuses 38 are provided to insure operation if one fuse should fail. The fuses 38 may be connected to separate charges 35 in the recess 36. One form of the invention having now been described in detail, the mode of operation is as next explained.

Assuming for purposes of description that the combustion chamber 14 of rocket 10 contains a solid fuel propellant, the auxiliary nozzles 15 are in communication with the combustion chamber and are designed to produce a cancelling thrust equal and opposite the thrust produced by the main propelling nozzle 13 and that the auxiliary nozzles 15 are to be opened when a predetermined terminal velocity of the rocket 10 is attained. Furthermore, let it be assumed that each of the auxiliary nozzles 15 is closed by a piston plug 25 as illustrated in FIGURE 2 and locked therein by the engagement of its radially projecting screw threads 30 with the screw threads 21 in the wall 18 of its nozzle.

The solid fuel in casing 11 when ignited will burn at a rapid rate and produce products of combustion therein at a high pressure. The flow of the combustion gases through the main nozzle 13 produces a forward thrust on the rocket 10 greater than the force of gravity to propel it through a fixed trajectory, or if beyond the force of gravity, in a particular path in space. Thus, the rocket 10 is propelled with an acceleration force which continually increases the velocity of the rocket. In order to be sure that the rocket will attain a desired velocity, an excess of fuel is provided in the casing 11.

When the rocket 10 has acquired its desired terminal velocity an electric ignition system including the ignitor 39 is closed to ignite the fuses 38 leading to the explosive charge 35. Thus, the detonation of the circular explosive charge 35 produces an explosive force around the entire periphery of the closure plug 25. This force acts between the wall 18 of the nozzle 15 and flange 29 of the piston plug 25 to deform the flange inwardly and disengage its screw threads 30 from the screw threads 21 in the wall 18 of the nozzle 15 to release the plug.

The surprising results produced by the construction described is that the flange 29 of the closure plug 25 is uniformly deformed around its entire periphery or, in other words, is shrunk to a smaller size by the explosive force to withdraw the screw threads 30 from engagement with the screw threads 21. By controlling the amount of the explosive charge 35 the flange 29 may be shrunk or deformed inwardly by the controlled amount necessary to release its screw threads 30 without otherwise deforming or shattering the plug. Such deformation of the flange 29 is believed to result from the flow of the material of the flange to produce a smaller inside and outside diameter of the flange with a resulting increase in the thickness of the flange. When the flange 29 of the piston plug 25 has been deformed to releasing position by the explosive charge 35, the plug is released and blown free from the nozzle 15 by the pressure of the products of combustion in the rocket casing 11.

After a closure plug 25 has been released and blown from its auxiliary nozzle 15 the products of combustion flow from the combustion chamber 14 through the auxiliary nozzle in a jet and produce a reverse thrust on the rocket 10. As the plurality of nozzles 15 are so designed as to produce a cancelling thrust equal and opposite to the thrust produced by the main propelling nozzle 13, there remains no component of thrust to accelerate the rocket so that it will remain the predetermined terminal velocity acquired at the time closure plugs 25 are released.

It will be understood that nozzles 15 may be used on one or more casing stages of a multi-staged rocket and the nozzles may be designed to produce a reverse thrust on a particular casing stage to separate it from the remaining stages between the burn-out of one stage and the ignition of the next stage. It will be further understood that the present invention may be applied to any type of auxiliary nozzle 15 on a rocket to further augment, cancel, reverse, or change the direction of the resultant thrust acting on the rocket 10.

FIGURE 6 illustrates a closure plug 25' of modified construction applied to an auxiliary nozzle 15' generally similar to the nozzle 15 in FIGURES 1 to 5. In the modified construction the wall 18' of the nozzle 15' has a cylindrical section 40 with a wall 41 of one inside diameter and a section 42 with a cylindrical wall 43 of a lesser diameter than the wall 41 with a conical wall or shoulder 44 therebetween. A step 45 is provided in the wall 43 of section 42 having screw threads 21' like those illustrated in FIGURES 1 to 5 for interlocking engagement with radially projecting screw threads 30' on the closure plug 25'. The closure plug 25' has a conical shoulder 46 corresponding to and overlying the conical surface 44 on the wall 18'. The explosive charge 35' is located in an annular groove 36' in the conical shoulder 46 of the closure plug 25'. The rim 28' of the closure plug 25' also is provided with an annular groove 31' in which the sealing gasket 32' is located the same as in FIGURES 1 to 5.

The closure plug 25' operates in substantially the same manner as previously described except that the explosive charge 35' when detonated, in addition to deforming the flange 29' to disengage the screw threads 30' from the screw threads 21', also acts to produce a propelling force on the closure plug to eject it from the nozzle 15'.

It will now be observed that the present invention provides an improved releasable plug construction for closing an auxiliary nozzle on a rocket engine which adapts the plug to be blown free from the nozzle when released. It will further be observed that the present invention provides a radially projecting annular rib on the closure plug which is deformed to a lesser diameter by an explosive charge to release it from locking engagement with the wall of the auxiliary nozzle. It will further be observed that the present invention provides a radially projecting screw threaded section on a piston plug which is shrunk by an explosive charge to release it from engagement with screw threads on the wall of the nozzle. It will further be observed that the invention provides an improved closure plug of the type indicated which is of simple and compact construction, economical to manufacture and one which is reliable in operation.

While a single embodiment of the invention is herein illustrated and described, it will be understood that changes

I claim:

1. In a rocket engine of the type having a casing for supplying a fluid under pressure and a main nozzle for producing a thrust to propel the rocket engine, the combination with said rocket engine of an auxiliary nozzle communicating with a source of pressure fluid in said casing for controlling the thrust of the main nozzle, said auxiliary nozzle having a tubular wall, a piston plug having a head extending across the auxiliary nozzle, a rim at the periphery of said head closely fitting the tubular wall for closing the auxiliary nozzle and an annular flange extending axially from the rim beyond the head along the side of the tubular wall, said flange of the closure plug and tubular wall of the auxiliary nozzle having an interlocking annular rib and recess for locking the plug in the nozzle, a peripheral recess in the piston plug between the rim and flange, and an annular explosive charge in the peripheral recess between the wall of the nozzle and flange of the plug and acting when detonated to deform the flange and separate the rib from locking engagement with the annular recess to release the plug whereby to open the auxiliary nozzle without fracturing the plug.

2. A control mechanism for controlling the thrust on a rocket engine having a casing containing a fluid under pressure and a main nozzle through which the fluid escapes to produce a thrust for propelling the rocket engine, comprising an auxiliary nozzle on the casing having a tubular wall with screw threads therein, a piston plug for closing the auxiliary nozzle and having a rim engaging the wall of the nozzle, said rim having an axially extending flange of reduced thickness with screw threads projecting radially from the flange of the rim and engaging the screw threads on the nozzle wall, and an annular explosive charge between the nozzle wall and plug for uniformly shrinking the flange when detonated to withdraw the screw threads thereon from locking engagement with the screw threads on the wall of the auxiliary nozzle whereby to release the piston plug which is ejected by the fluid under pressure to open the auxiliary nozzle without fracturing the plug.

3. A control mechanism in accordance with claim 2 in which the rim of the piston plug closely fits the cylindrical wall of the auxiliary nozzle, the flange projecting axially from the rim, an annular recess in the piston plug between the rim and flange, and said explosive charge being located in the annular recess.

4. A control mechanism in accordance with claim 3 in which the piston plug has a hole extending from the exterior of the plug to the annular recess, a fuse extending from the explosive charge through the hole to the exterior of the piston plug, and means for igniting the fuse.

5. A control mechanism in accordance with claim 3 in which the rim of the piston plug has a second annular groove, and a compressible gasket in said second groove for sealing the joint between the rim of the piston plug and wall of the auxiliary nozzle.

6. A control mechanism for controlling the thrust of a rocket engine having a casing containing a fluid under pressure and a main nozzle for producing a thrust to propel the rocket engine comprising, an auxiliary nozzle on the casing having adjacent sections of different diameters with a conical shoulder therebetween, the section of the nozzle casing of greater diameter having screw threads adjacent the conical shoulder, a closure plug having a rim engaging the section of the nozzle wall having a smaller diameter, a flange of less thickness than and projecting from the rim and having a conical section overlying the conical shoulder on the wall of the auxiliary nozzle and a cylindrical section with radially projecting screw threads engaging the screw threads on the nozzle wall, and an annular explosive charge positioned between the conical surfaces on the wall of the nozzle and closure plug whereby the explosive charge, when detonated, shrinks the annular flange of the plug to withdraw its screw threads and propels the released plug from the nozzle without fracturing the plug.

7. A control for instantaneously releasing a piston plug from an orifice in an apparatus which applies a force to one side of the plug comprising a peripheral wall surrounding the orifice and having an annular recess therein, said piston plug for closing the orifice having a head extending across the orifice, a rim at the periphery of the head closely fitting the peripheral wall surrounding the orifice and an annular flange extending axially from the rim beyond the head along the peripheral wall, said flange having a radially projecting rib engaging the annular recess in the peripheral wall, a peripheral recess in the piston plug between the rim and flange, and an explosive charge in the peripheral recess surrounding the plug and acting between the peripheral wall and axially extending flange of the plug to deform the flange inwardly uniformly around its entire periphery to withdraw the rib from the annular recess in the peripheral wall to release the plug, whereby to adapt the plug to be ejected from the orifice by the force acting on the side thereof without fracturing the plug.

References Cited in the file of this patent

UNITED STATES PATENTS

| | | |
|---|---|---|
| 2,850,976 | Seifert | Sept. 9, 1958 |
| 2,952,972 | Kemmel et al. | Sept. 20, 1960 |
| 2,999,912 | Kincaid et al. | Sept. 12, 1961 |